(12) United States Patent
Costa et al.

(10) Patent No.: US 10,734,799 B2
(45) Date of Patent: Aug. 4, 2020

(54) POWER SUPPLY WITH CURRENT LIMIT ON INDIVIDUAL CONDUCTORS

(71) Applicant: Apple Inc., Cupertino, CA (US)

(72) Inventors: Paul J. Costa, Sunnyvale, CA (US); Bharat K. Patel, San Jose, CA (US); Neal V. Cecil, Cupertino, CA (US); Timur O. Starobinets, Lexington, MA (US); Ruenjou Lu, Fremont, CA (US); Dane Oleson, Santa Clara, CA (US); Fei Ni, Mountain View, CA (US)

(73) Assignee: Apple Inc., Cupertino, CA (US)

(*) Notice: Subject to any disclaimer, the term of this patent is extended or adjusted under 35 U.S.C. 154(b) by 536 days.

(21) Appl. No.: 15/506,698

(22) PCT Filed: Aug. 29, 2014

(86) PCT No.: PCT/US2014/053490
§ 371 (c)(1),
(2) Date: Feb. 24, 2017

(87) PCT Pub. No.: WO2016/032522
PCT Pub. Date: Mar. 3, 2016

(65) Prior Publication Data
US 2017/0288386 A1    Oct. 5, 2017

(51) Int. Cl.
*H02H 7/00* (2006.01)
*H02H 9/00* (2006.01)
(Continued)

(52) U.S. Cl.
CPC .............. *H02H 3/08* (2013.01); *H02H 3/22* (2013.01); *H02H 7/125* (2013.01); *H02H 7/22* (2013.01);
(Continued)

(58) Field of Classification Search
CPC ............. H02H 3/08; H02H 7/22; H02H 7/125
(Continued)

(56) References Cited

U.S. PATENT DOCUMENTS 5,337,205 A    8/1994    Haun et al.
7,304,462 B2 *  12/2007    Shvarts ..................... H02J 1/10
                                         323/284
(Continued)

OTHER PUBLICATIONS

International Search Report and Written Opinion dated May 18, 2015 in PCT/US2014/053490, 13 pages.

*Primary Examiner* — Thienvu V Tran
*Assistant Examiner* — Lucy M Thomas
(74) *Attorney, Agent, or Firm* — Kilpatrick Townsend & Stockton, LLP

(57) ABSTRACT

Circuits, methods, and apparatus that may provide power supply voltages in a safe and reliable manner that meets safety and regulatory concerns and does not exceed physical limitations of cables and other circuits and components used to provide the power supply voltages. One example may provide a cable having a sufficient number of conductors to provide power without exceeding a maximum current density for the conductors. Another example may provide a cable having more than the sufficient number of conductors in order to provide an amount of redundancy. Current sense circuits may be included for one or more conductors. When an excess current is sensed, a power source in the power supply may be shut down, the power source may be disconnected from one or more conductors, or both events may occur.

21 Claims, 15 Drawing Sheets

(51) Int. Cl.
   *H02H 3/08* (2006.01)
   *H02H 7/22* (2006.01)
   *H02J 13/00* (2006.01)
   *H02H 3/22* (2006.01)
   *H02J 1/00* (2006.01)
   *H02H 7/125* (2006.01)

(52) U.S. Cl.
   CPC ............ *H02H 7/226* (2013.01); *H02H 7/228* (2013.01); *H02J 1/00* (2013.01); *H02J 13/0003* (2013.01); *Y02B 90/228* (2013.01); *Y04S 20/18* (2013.01)

(58) Field of Classification Search
   USPC .......................................................... 361/18
   See application file for complete search history.

(56) References Cited

U.S. PATENT DOCUMENTS

| | | | |
|---|---|---|---|
| 8,537,517 B1 * | 9/2013 | Banak | H02H 11/002 361/93.1 |
| 2001/0040410 A1 | 11/2001 | Akiba | |
| 2003/0045137 A1 * | 3/2003 | Yamane | B60R 16/0238 439/76.2 |
| 2009/0001938 A1 | 1/2009 | Vantu et al. | |
| 2009/0160248 A1 | 6/2009 | Ang | |
| 2010/0033140 A1 * | 2/2010 | Otake | B60L 3/04 320/165 |
| 2010/0164289 A1 | 7/2010 | Umminger | |
| 2013/0272034 A1 * | 10/2013 | Basso | G05F 1/575 363/21.04 |

\* cited by examiner

POWER SUPPLY WITH CURRENT LIMIT ON INDIVIDUAL CONDUCTORS

CROSS-REFERENCES TO RELATED APPLICATIONS

This application is the U.S. National Phase of PCT Application No. PCT/US2014/053490, filed Aug. 29, 2014, the disclosure of which is incorporated by reference.

BACKGROUND

Electronic devices need power for their operation. This power may be delivered internally, for example from a battery, or externally, for example from a power supply. An external power supply may be a unit designed with the primary purpose of providing power, or the external power supply may be part of another electronic device. For example, a laptop computer may include a power supply that provides power to a portable media device. Power provided by an external supply may be provided over a cable or other electrical conductor. These cables may have connectors on each end that may mate with connectors on the power supply and the electronic device that is receiving the power. These cables may provide only power, or they may provide power and data. Data may be provided over wire conductors, fiber optic conductors, or other types of conductors in the cables.

These power supplies and electronic devices may be located near each other in a relatively benign environment. For example, the above laptop and portable media player may be located near each other on an office desk. But in other situations, the devices may be more remote from each other. In these or other situations, there may be a less benign environment between external power supply and the electronic device. In these situations, a cable providing power from a power supply to an electronic device may be routed over a long distance, it may be routed through a harsh environment, it may be routed through a path where damage is likely, or it may be routed through another potentially hazardous path.

This routing may lead to concerns about the physical limitations of the cable being used. For example, a cable may have a maximum current above which localized heating may damage the cable. The potential for this or other damage that may be caused by these hazardous pathways may lead to safety concerns for the power supply, the electronic device being powered, and third parties. These safety concerns may implicate regulatory aspects as well.

Thus, what is needed are circuits, methods, and apparatus that may provide power supply voltages in a safe and reliable manner that meets these safety and regulatory concerns and does not exceed physical limitations of cables and other circuits and components used to provide the power supply voltages.

SUMMARY

Accordingly, embodiments of the present invention may provide circuits, methods, and apparatus that may provide power supply voltages in a safe and reliable manner that meets safety and regulatory concerns and does not exceed physical limitations of cables and other circuits and components used to provide the power supply voltages.

An illustrative embodiment of the present invention may provide power over a number of conductors, where the number of conductors meets or exceeds the number of conductors needed to convey the power. For example, power at a first voltage and a first current may be conveyed over a cable. The cable may include conductors that are each capable of carrying a second current. An embodiment of the present invention may include N conductors, where N is the first current divided by the second current, rounded up to the next highest integer. In this way, each conductor carries a current less than its maximum current level and does not exceed its physical limitations. Another embodiment of the present invention may convey this same power over a cable including N+M conductors. In this case, there is redundancy in the number of conductors. That is, M conductors may become damaged such that they are nonfunctional while still allowing the cable to convey the power without exceeding the remaining conductors' current carrying capabilities.

In these and other embodiments of the present invention, current sense circuitry may be included for one or more of conductors to determine whether a fault condition has occurred with those conductors. This current sense circuitry may include a resistor between a power source in the power supply and a conductor. Current flowing in the conductor may generate a voltage across the resistor, and this voltage may be compared to a reference voltage. When the reference voltage is exceeded, the power source may be shut down, the power source may be disconnected from the conductor, or both of these events may occur. In various embodiments of the present invention, the power source may be disconnected from only the conductor having excess current, though in other embodiments of the present invention, the power source may be disconnected from more than one or all of the power carrying conductors in the cable.

The current sense circuitry may include a comparator to compare the voltage across the resistor to a reference voltage in order to determine whether a fault condition has occurred. A low-pass filter may be placed in series with the comparator such that the comparator does not receive noise spikes on the power supply that may otherwise cause false events at the comparator output.

The current sense circuitry may provide a rapid and reliable path for quickly disconnecting a power source in the power supply from one or more conductors. Specifically, this path may be completely implemented in hardware. A hardware current sense path may provide circuitry to disconnect the power source from the conductor that is very fast and software free. The speed of the path may provide a power supply that can quickly remove power from what may otherwise become a hazardous situation. This hardware path may not be vulnerable to software bugs or viruses and may therefore be more reliable.

The current sense circuitry may include a second path that may be slower and may involve microcode or other software in a control circuit, central processing unit, or microcontroller in order to shut down the power source in the power supply. This may further protect the power supply circuitry in a fault condition.

Again, the current sense circuitry may provide a rapid path for quickly disconnecting a power source in the power supply from one or more conductors. For example, a switch may be placed between a power source and the conductors for a cable. In this and other embodiments of the present invention, a power supply may provide power for one or more electronic devices over one or more cables. In these situations, individual switches may be placed between a power source and each group of conductors for a cable, or between the power source and one or more individual conductors in a cable, or some combination thereof.

In these and other embodiments of the present invention, further safety enhancements may be provided. For example, fuses may be provided between a power source and one or more conductors. Additional fuses may be placed between groups of conductors (and their fuses) and the power source. These additional fuses may be particularly useful in meeting compliance with regulations that may limit an amount of power that may be provided over an individual group of conductors.

These and other embodiments of the present invention may avoid exposing high voltages where they may be encountered by users, third parties, or their property. In these embodiments, various protections to ensure that a cable is connected before power is provided over the cable may be provided. For example, a power supply may initially provide a low-voltage power supply voltage to a remote electronic device. The lower voltage power supply may be protected by a switch that may disconnect the low-voltage power supply from one or more conductors. The switch may be a self-resetting switch. The remote electronic device may include a connection sensing circuit that may be powered by the lower voltage. When the cable is connected, the connection sensing circuit may receive the power and may then provide a response back through the cable to the power supply. From the response, the power supply may infer that the cable is connected and the full power supply may be provided over the cable to the remote electronic device.

These and other embodiments of the present invention may provide protection against inductive kickback and similar transient phenomena. Cable conductors, like all wires, have an inductive component. When current flowing in a conductor is abruptly stopped, for example by opening a switch described above, the change in current may result in a voltage spike. This may be referred to as inductive kickback. A sufficiently high voltage spike may damage electronic circuits connected to the conductors. Accordingly, embodiments of the present invention may include protection or transient voltage suppressant circuits. These circuits may include transient voltage suppressant diodes and bulk capacitors. This circuitry may be implemented near the switches or other power-generation related circuitry.

These and other embodiments of the present invention may provide a further check that the cable is securely connected. These embodiments of the present invention may prevent power from being provided by the cable when a connection to a device or power supply is skewed or marginally formed. In a specific embodiment of the present invention, a circuit may ensure that first and second contacts at far ends of a connector form electrical connections with corresponding contacts in a mating connector. If either electrical connection is absent, high power is not provided to the cable, though lower power may be provided, for example where an electronic device includes a connection sensing circuit. The first and second contacts may be break-first make-last type contacts, where these contacts are shorter or further away from a front edge of the connector.

In various embodiments of the present invention, different types of switches may be used to disconnect power sources from one or more conductors. For example, silicon MOSFET or bipolar switches may be used. For example, back-to-back MOSFET transistors may be used to prevent forward and reverse current flow during a disconnection. In other embodiments of the present invention, relays, microelectromagnetic switches, or other types of switches may be used.

In these and other embodiments of the present invention, the cables may convey data and power. This power and data may include signals that are compliant with various standards such as Universal Serial Bus (USB), a High-Definition Multimedia Interface (HDMI), Digital Visual Interface (DVI), power, Ethernet, DisplayPort, Thunderbolt, Lightning and other types of standard and non-standard interfaces that have been developed, are being developed, or will be developed in the future. In various embodiments of the present invention, the paths provided these cables may be used to convey power, ground, signals, test points, and other voltage, current, data, or other information.

Embodiments of the present invention may provide power to, and possibly communicate with, various types of devices, such as portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, devices for providing functional or decorative lighting, and other devices.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
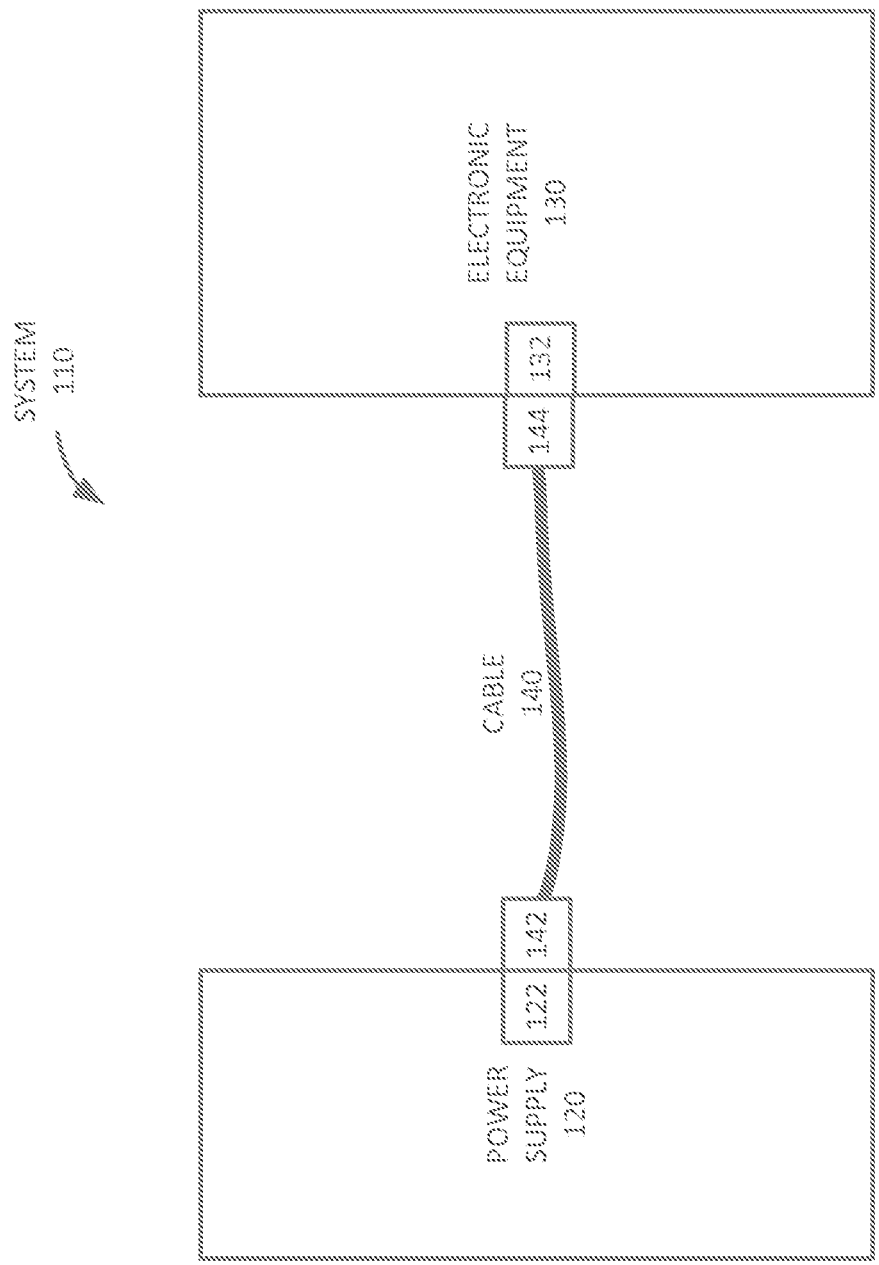
FIG. 1 illustrates an electronic system that may be improved by the incorporation of an embodiment of the present invention.

FIG. 1 illustrates an electronic system that may be improved by the incorporation of an embodiment of the present invention. This figure, as with the other included figures, is shown for illustrative purposes and does not limit either the possible embodiments of the present invention or the claims.

This figure includes electronic equipment 130. Electronic equipment 130 may receive power and possibly data at connector 132. Connector 132 may be a connector receptacle. Electronic equipment 130 may be a device, such as portable computing device, tablet computer, desktop computer, laptop, all-in-one computer, wearable computing device, cell phone, smart phone, media phone, storage device, portable media player, navigation system, monitor, power supply, adapter, remote control device, charger, device for providing functional or decorative lighting, or other type of electronic device.

Electronic equipment 130 may receive one or more power supply voltages from power supply 120. Power supply 120 may provide power supply voltages at its connector 122. Connector 122 may be a connector receptacle. Power may be provided or transferred from power supply 120 to electronic equipment 130 over cable 140. Cable 140 may include a number of conductors (not shown) terminated in contacts in connectors 142 and 144. Connectors 142 and 144 may be connector inserts arranged to fit in connector receptacles 122 and 132. The contacts in connectors 142 on 144 may form electrical pads with corresponding contacts in connectors 122 and 132.

Again, cable 140 may convey one or more power supply voltages from power supply 120 to electronic equipment 130. Data may be transferred between power supply 120 and electronic equipment 130. This data may be related to the power being supplied, or it may relate to other factors. For example, power supply 120 may be a part of a larger an electronic system that is in communication with electronic equipment 130.

Cable 140 may be routed in a relatively benign environment, such as a home or office environment. In other situations, cable 140 may be routed in a less hospitable environment. For example, cable 140 may be routed over a very long distance. Cable 140 may be routed through various gasses or corrosive liquids or gases. In still other situations, cable 140 may be routed through walls or other building structures that may be altered, renovated, or otherwise reconstructed in ways that may damage a cable. In still other embodiments, cable 140 may be subjected to extreme temperatures, or damage caused by earthquakes, fires, or other events.

These hazardous conditions may cause faults in a cable. For example, corrosive materials may dissolve or sever a connector in the cable. Nails may be driven into walls shorting out individual conductors in cable to each other or to other conductive structures. Earthquakes may cause other equipment or structures to fall on the cable, thereby severing one or more conductors or otherwise damaging the cable.

These events and situations may lead to concerns about safety. These safety concerns may implicate regulations that may have been promulgated in response to these safety concerns. These events and situations may also lead to concerns about the physical limitations of the components of electronic system 110 including cable 140, connectors including connectors 142 and 144, and the materials used therein.

Accordingly, embodiments of the present invention may provide circuits, methods, and apparatus that may provide power supply voltages in a reliable manner that meets the needs for safety and regulator concerns, and does not exceed physical limitations of cables and other circuits and components used to provide the power supply voltages.

Again, cable 140 may provide power from power supply 120 to electronic equipment 130 and data between power supply 120 and electronic equipment 130. An example of such a cable is shown in the following figure.

Figure 2:
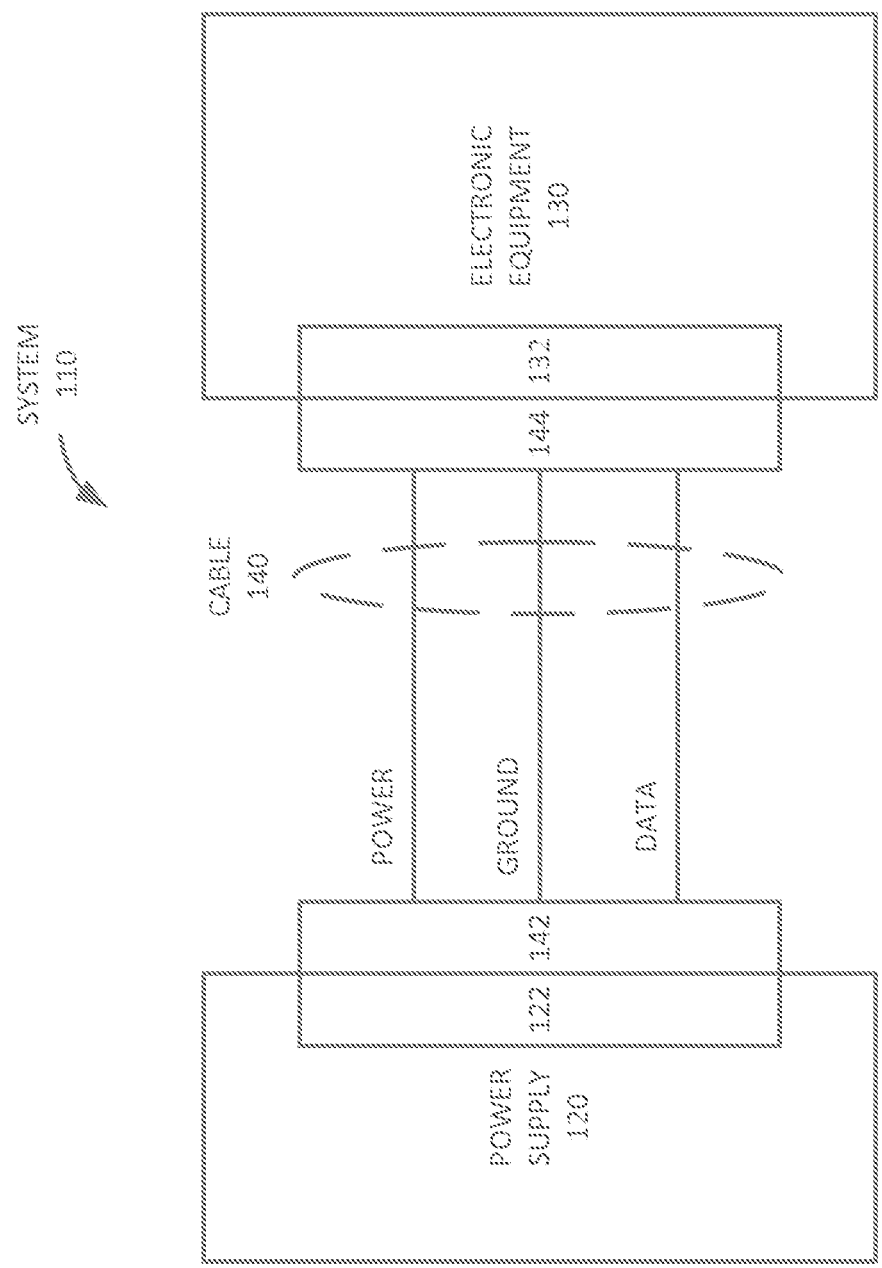
FIG. 2 illustrates an electronic system according to an embodiment of the present invention.

FIG. 2 illustrates an electronic system according to an embodiment of the present invention. As before, power supply 120 may supply power to electronic equipment 130. Specifically, power supply 120 may provide one or more power supply voltages on pins or contacts of connector 122. Corresponding pins or contacts in connector 142 may provide the power supplies on power conductors in cable 142 to contacts of connector 144. Corresponding contacts in connector 132 may receive these power supply voltages and provide them to electronic equipment 130. Similarly, ground current may be returned from electronic equipment 130 to power supply 120 through these same connectors and the ground conductors in cable 140. Data may also be transferred over one or data lines in cable 140. In various embodiments of the present invention, cable 140 may include one, two, three, four, or more conductors for power, one, two, three, four, or more conductors for ground, and one, two, three, four, or more conductors for data.

In other embodiments of the present invention, power supply 120 may provide one or more power supply voltages to more than one piece of electronic equipment. An example is shown in the following figure.

Figure 3:
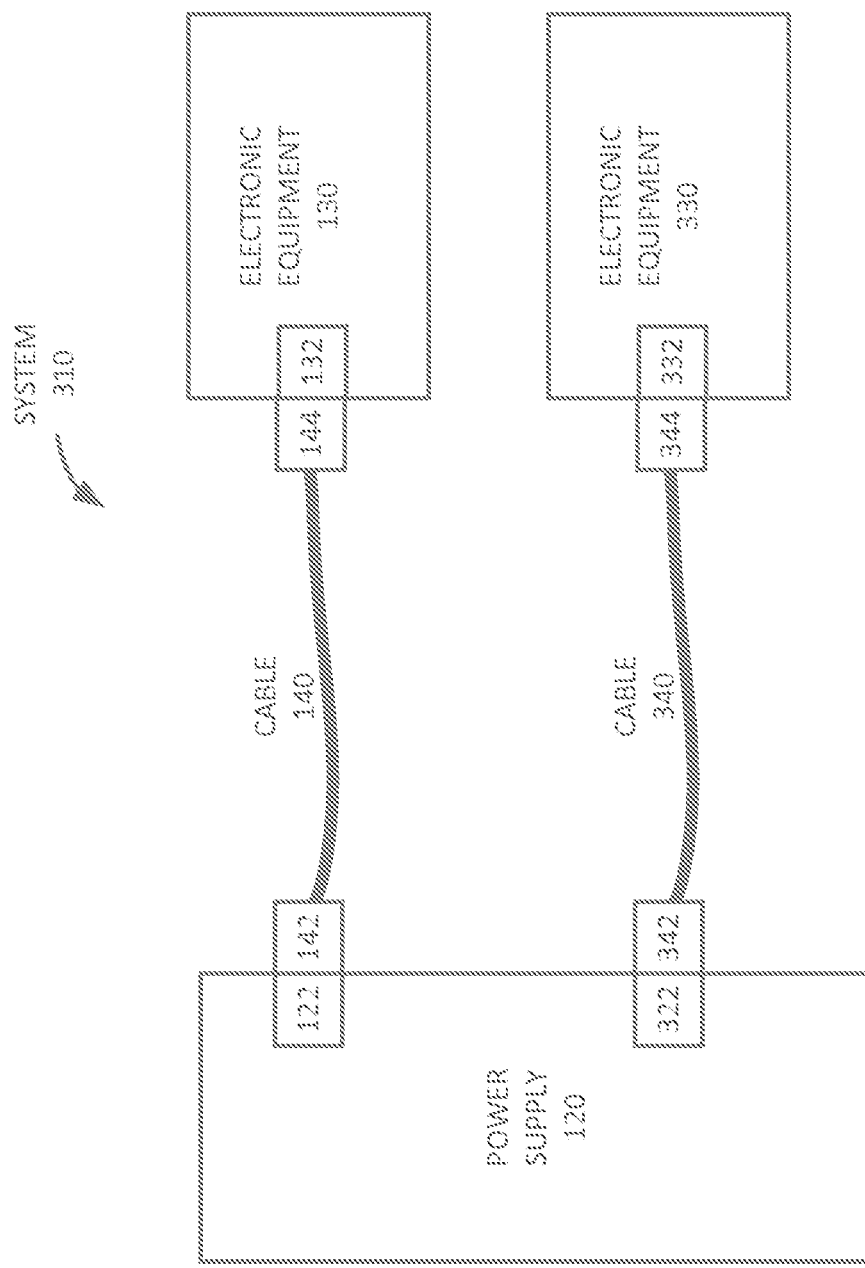
FIG. 3 illustrates an electronic system according to an embodiment of the present invention.

FIG. 3 illustrates an electronic system according to an embodiment of the present invention. In this figure, power supply 120 may provide one or more power supply voltages to electronic equipment 130 and electronic equipment 330. Specifically, power supply 120 may provide power over cable 140 to electronic equipment 130 as before. Power supply 120 may also provide one or more power supply voltages to electronic equipment 330 via connectors 322 and 342, cable 340, and connectors 344 and 332. While in these examples cable 140 is shown as being separate from power supply 120 and electronic equipment 130, in other embodiments of the present invention, cable 140 may be tethered to either or both power supply 120 and electronic equipment 130.

Again, embodiments of the present invention may provide circuits, methods, and apparatus that may provide power supply voltages and power in a reliable manner that meets the needs for safety and regulatory concerns and does not exceed physical limitations of cables and other circuits and components used to provide a power supply voltages. In one example, current levels may be monitored in one or more conductors in cable 140. If this monitored current exceeds a predetermined level in a conductor, a power source may be disconnected from that connector, from all conductors in a cable, or from some number of such conductors. An example is shown in the following figure.

Figure 4:
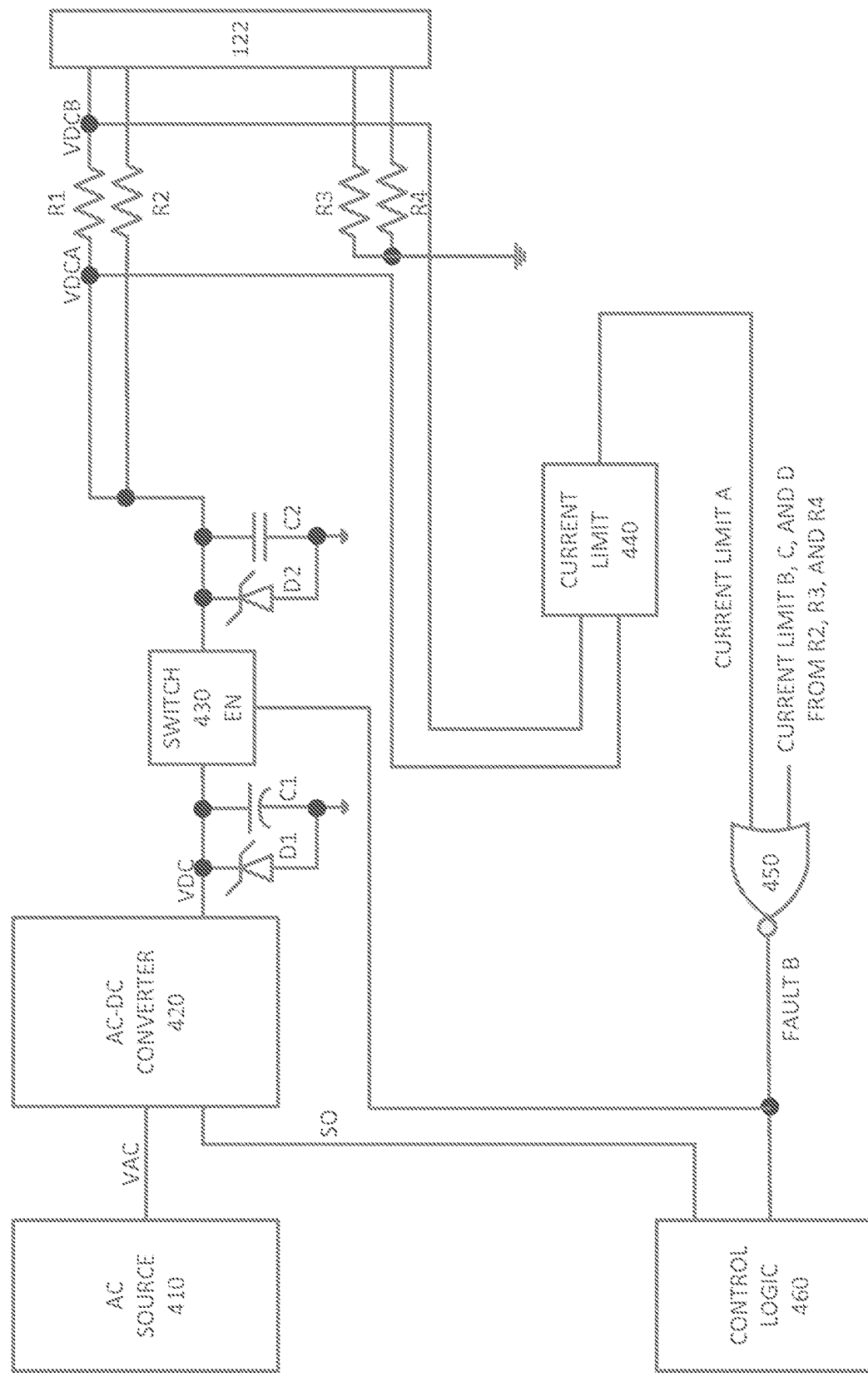
FIG. 4 illustrates power supply circuitry according to an embodiment of the present invention.

FIG. 4 illustrates power supply circuitry according to an embodiment of the present invention. Power supply 120 may receive a line voltage from an AC source 410, though it may receive power from other sources, such as battery or car chargers. This AC power may be received by a power source, which may be an AC-to-DC converter 420. Instead of an AC-to-DC converter 420, the power source may instead be in other type of converter, voltage buffer, or other type of circuit. Switch 430 may be located between an output of the power source or AC-to-DC converter 420 and one or more contacts in connector 122, which may in turn be coupled to conductors in a cable, such as cable 140, that is external to the power supply. With this configuration, switch 430 may be opened in order to disconnect power source or AC-to-DC converter 420 from the conductors in the cable.

Again, such a disconnection may result in inductive kickback that may be damaging to switch 430, converter 420, and other circuitry. Conductors in cable 140 may have an inductive component and when current flowing in a conductor is abruptly stopped, for example by opening switch 430, the change in current may result in an inductive kickback voltage spike. Accordingly, embodiments of the present invention may provide protection against this and similar transient phenomena. Specifically, embodiments of the present invention may utilize protection or transient voltage suppressant circuits that may include transient voltage suppressant diodes and bulk capacitors. These diodes may be unidirectional or bidirectional transient voltage suppressant diodes, or other avalanche or Zener type diodes. This circuitry may be implemented near switch 430, power source 410, or other power-generation related circuitry.

In this example, transient voltage suppressant diodes D1 and D2 may be included on either side of switch 430 to protect switch 430 from inductive kickback. Capacitor C1 may be added at the input of switch 430. Capacitor C1 may be an electrolytic, ceramic, or other type of capacitor. In practice, the input of switch 430 may typically swing positive during an inductive kickback event and C1 may sink some of the energy of the kickback. C2 may be added at the output of switch 430. C2 may be a ceramic, electrolytic, or other type of capacitor. In practice, the output of switch 430 may typically swing negative during an inductive kickback event and C2 may sink some of the energy of the kickback.

The power path may be split, in this example into two conductors or groups of conductors. These conductors may be in a cable, such as cable 140, and the conductors may be connected to resistors R1 and R2 through connector 122. The conductors may be rejoined at an electronic device, such as electronic equipment 130, to provide power to the device. Resistors R1, R2, R3, and R4, may be placed in series with power and ground conductors in the cable. Current limit or detect circuitry 440 may read voltages across these resistors. The level of these voltages may be dependent on the level of the current in conductors in a cable.

These voltages may be compared to a reference voltage, where a high voltage level across the resistor as compared to the reference voltage may indicate that an excess amount of a current is flowing in the conductor. This may cause current limit circuit 440 to trip to a high state. This high state may cause the output of NOR gate 450 to become low, thereby disabling switch 430 and disconnecting the power source or AC-to-DC converter 420 from the cable conductors.

This current limit path may provide a path having a fast reaction time. This may improve safety of power supply 120. For example, an object may fall on cable 140, causing a short circuit between a power connector and a ground conductor. This short may cause very high currents to flow in these two conductors. These high currents may cause heating and become a fire danger. The current limit loop in this embodiment of the present invention may respond very quickly, disconnecting the power supply from a shorted conductor thereby removing this danger. Also, this loop may be a hardware loop that is accordingly free from software bugs or viral attacks.

Once a disconnection between power source or AC-to-DC converter 420 and the conductors has been accomplished, the power source itself may be disabled. This may be controlled by control logic 460, which may receive the FAULTB signal from NOR gate 450 and may provide a power down signal on line SO to power source or AC-to-DC converter 420. Control logic 460 may be a control logic circuit, microcontroller, central processing unit, or other type of processor or controller.

Each conductor in a cable may have a maximum current level at which it may operate. Current above this level may cause heating in these conductors. This heating may be severe enough to cause migration of metal in the conductors, thereby causing disconnections. This heating may also be severe enough to pose a fire hazard. Accordingly, embodiments of the present invention may provide a sufficient number of conductors in a cable such that this current limit is not reached or exceeded. In these and other embodiments of the present invention, additional conductors may be included as a level of redundancy. That is, a number of conductors up to and including the number of additional redundant conductors may be severed or disconnected and the cable may still provide the required power. The current in each of these conductors may be monitored using a resistor or other components or components in the power supply. Each of these resistors or other components may monitor a current in a single conductor or more than one conductor.

In this example, two power supply lines and two ground lines are shown. In other embodiments of the present invention, one, three, four, or more power supply and ground lines may be employed, and each ground line may connect to one or more conductors in a cable, such as cable 140.

In this figure, only one current limit path is shown for simplicity, though current limit paths for other power supply lines and ground lines may be included. An example that includes additional current paths is shown in the following figure.

Figure 5:
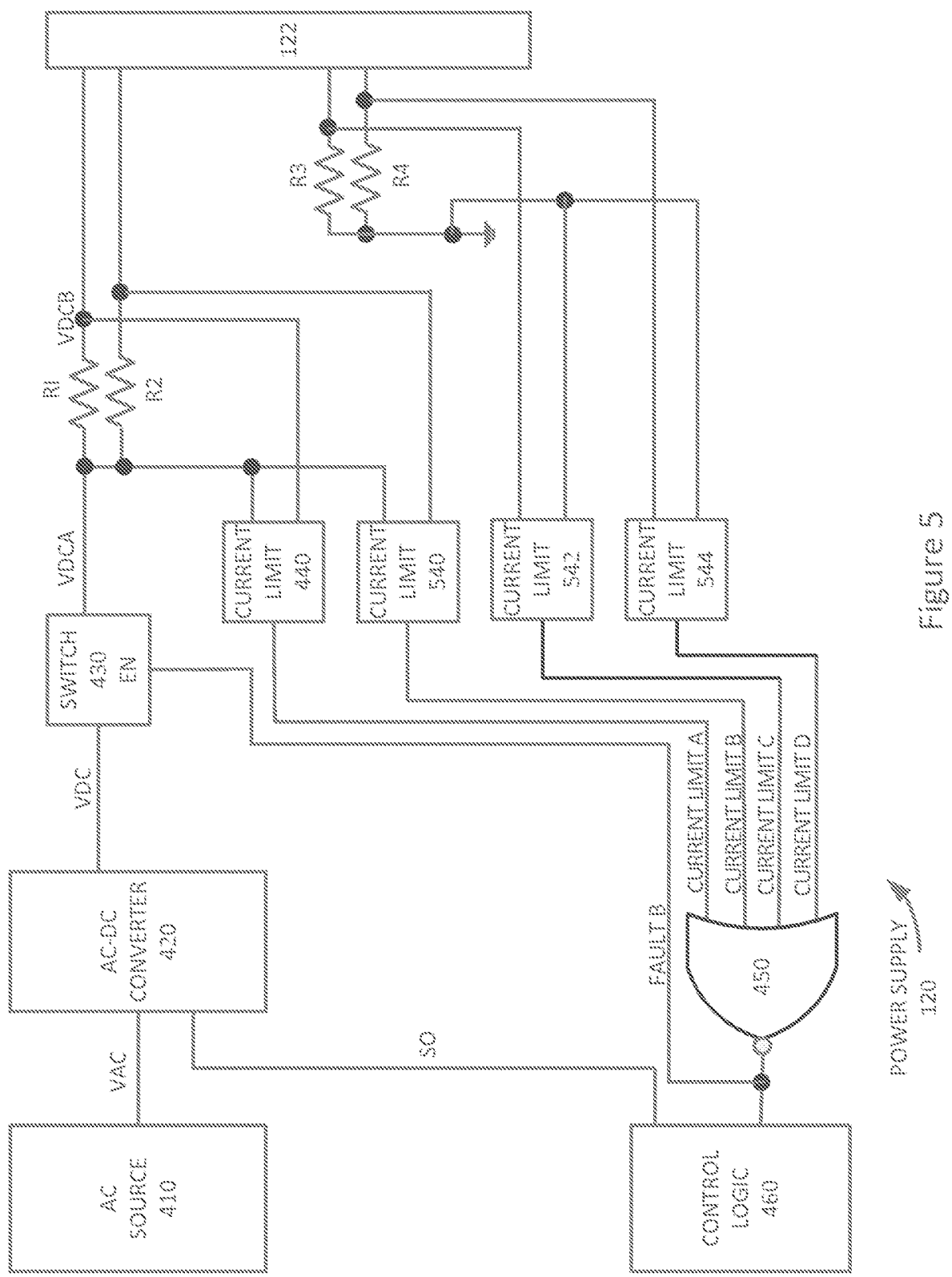
FIG. 5 illustrates another power supply circuit according to an embodiment of the present invention.

FIG. 5 illustrates another power supply circuit according to an embodiment of the present invention. As before, resistors R1, R2, R3, and R4 may each be in series with one or more conductors in a cable, such as cable 140, connected to connector 122. Current limit circuits 440, 540, 542, and 544 may monitor voltages across corresponding ones of these resistors. When a voltage across any of these resistors exceeds a predetermined level, the output of the corresponding current limit circuit may go high, thereby causing signal FAULTB to go low resulting in the opening or disabling of switch 430. The opening or disabling of switch 430 may disconnect the power source or AC-to-DC converter 420 from the conductors in series with resistors R1 and R2.

In various embodiments of the present invention, resistors R1, R2, R3, and R4 may have the same or different values. Also, current limit circuits 440, 540, 542, and 544 may compare voltages to different reference levels. For example, resistor R1 may be in series with a single conductor, while resistor R2 may be in series with multiple conductors. In such a situation, the values of resistors R1 and R2 or the reference levels in current limit circuits 440 and 540, or both, may be adjusted appropriately.

In this example, when a fault occurs on one conductor, switch 430 may open, thereby disconnecting all power supply conductors from power source or AC-to-DC converter 420. Again, transient voltage suppressant circuits, such as diodes D1 and D2 and capacitors C1 and C2 in FIG. 4 may be included to protect switch 430 but are omitted here for clarity. In other embodiments of the present invention, power may be disconnected from the conductors on an individual or group basis. This may allow one or more conductors in a cable to be disconnected while power may continue to be provided using the remaining conductors. An example is shown in the following figure.

Figure 6:
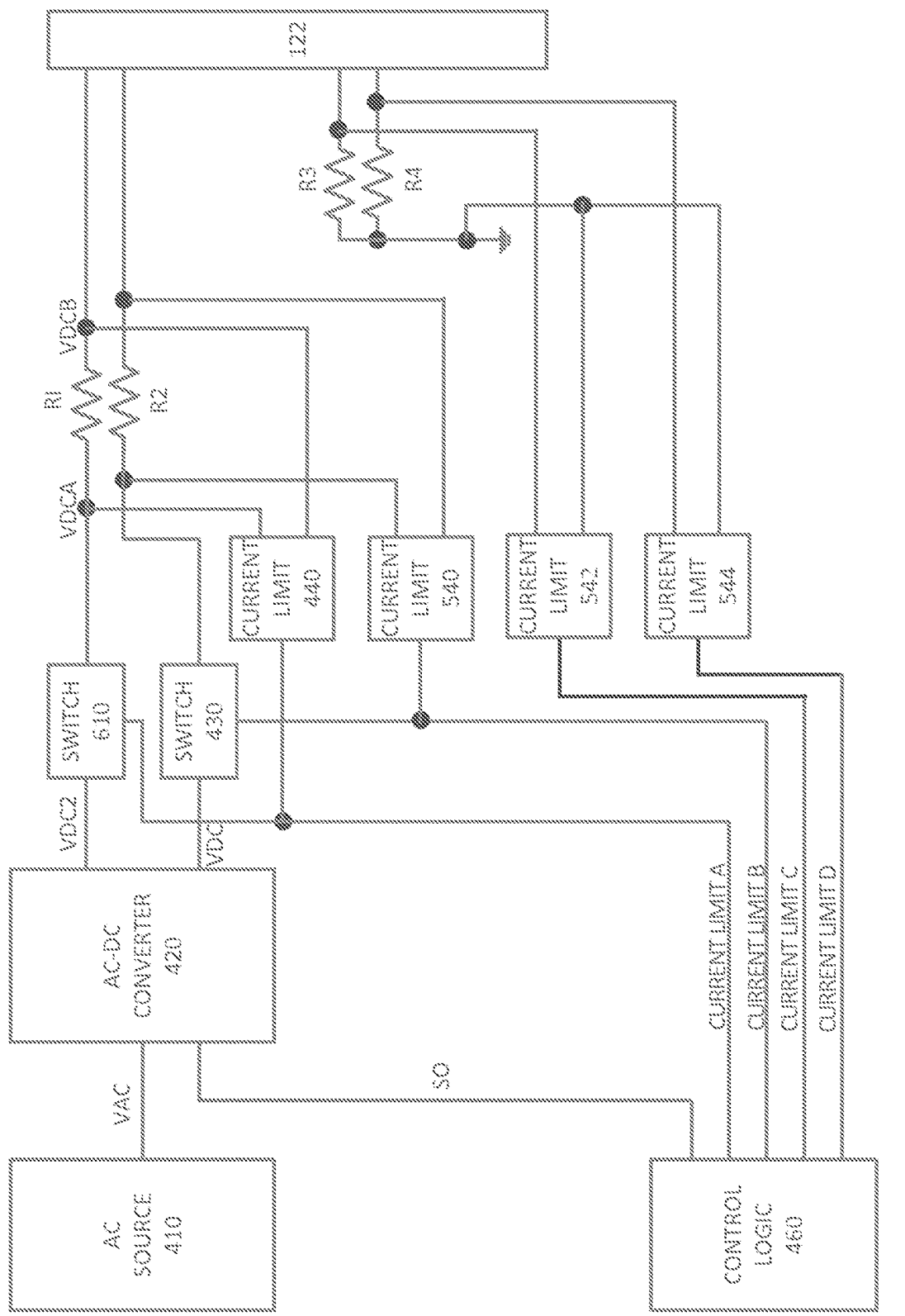
FIG. 6 illustrates power supply circuitry including switches for individual conductors according to an embodiment of the present invention.

FIG. 6 illustrates power supply circuitry according to an embodiment of the present invention. In this example, a second or additional switch 610 may be included. In this way, switches 610 and 430 may receive power supply voltages from power source or AC-to-DC converter 420 and may provide each power supply voltage to one or more conductors in a cable via connector 122. In various embodiments of the present invention, the same power supply voltage may be received by both switches 610 and 430, the two power supply voltages may be separate but have at least approximately the same value, or the two power supply voltages may be different. Also, in this example, the individual current limit circuits 440, 540, 542, and 544 provide outputs to control logic 460 instead of NOR gate 450. This may preserve information regarding which conductors are in a fault condition so that switches 610 and 430 may independently disconnect conductors as needed. By contrast, combinatorial logic, such as NOR gate 450, may remove this per-conductor information and may not be as well-suited with the use of multiple switches such as 610 and 430.

Again, as an example an object may fall on the cable thereby shorting a power supply conductor to a ground conductor in the cable. Again, this may cause a large current to flow, and for illustrative purposes that large current may flow through resistor R1. This may cause current limit circuit 440 to trip, thereby disabling or opening switch 610. This open switch may disconnect power source or AC-to-DC converter 420 from resistor R1 and its associated cable conductor or conductors. This may allow power to continue to be provided through switch 430, resistor R2, and its conductor or conductors.

In some circumstances, the opening of switch 610 may cause a cascade to occur. That is, once switch 610 is open, more current may flow through switch 430 and resistor R2. This increase in current may trip current limit 540, thereby disabling switch 430. Once both switches 610 and 430 are open are disabled, control logic 460 may shut down or disable power source or AC-to-DC converter 420. Again, transient voltage suppressant circuits, such as diodes D1 and D2 and capacitors C1 and C2 in FIG. 4 may be included to protect either or both switch 430 and switch 610, but are omitted here for clarity.

It this example, switches 610 and 430 are shown as being in series in the power supply path. In other embodiments of the present invention, similar switches may be included in the ground return paths. Also, while control logic 460 may shut down or disable power source or AC-to-DC converter 420 when over-current events are detected by current limit circuit 440 and current circuit limit 540, control logic 460 may also shut down or disable power source or AC-to-DC converter 420 when over-current are detected by current limit circuits 542 and 544 in the ground return paths.

In various embodiments of the present invention, the current limit circuit paths may be implemented using various types of circuitry. A specific example is shown in the following figure.

Figure 7:
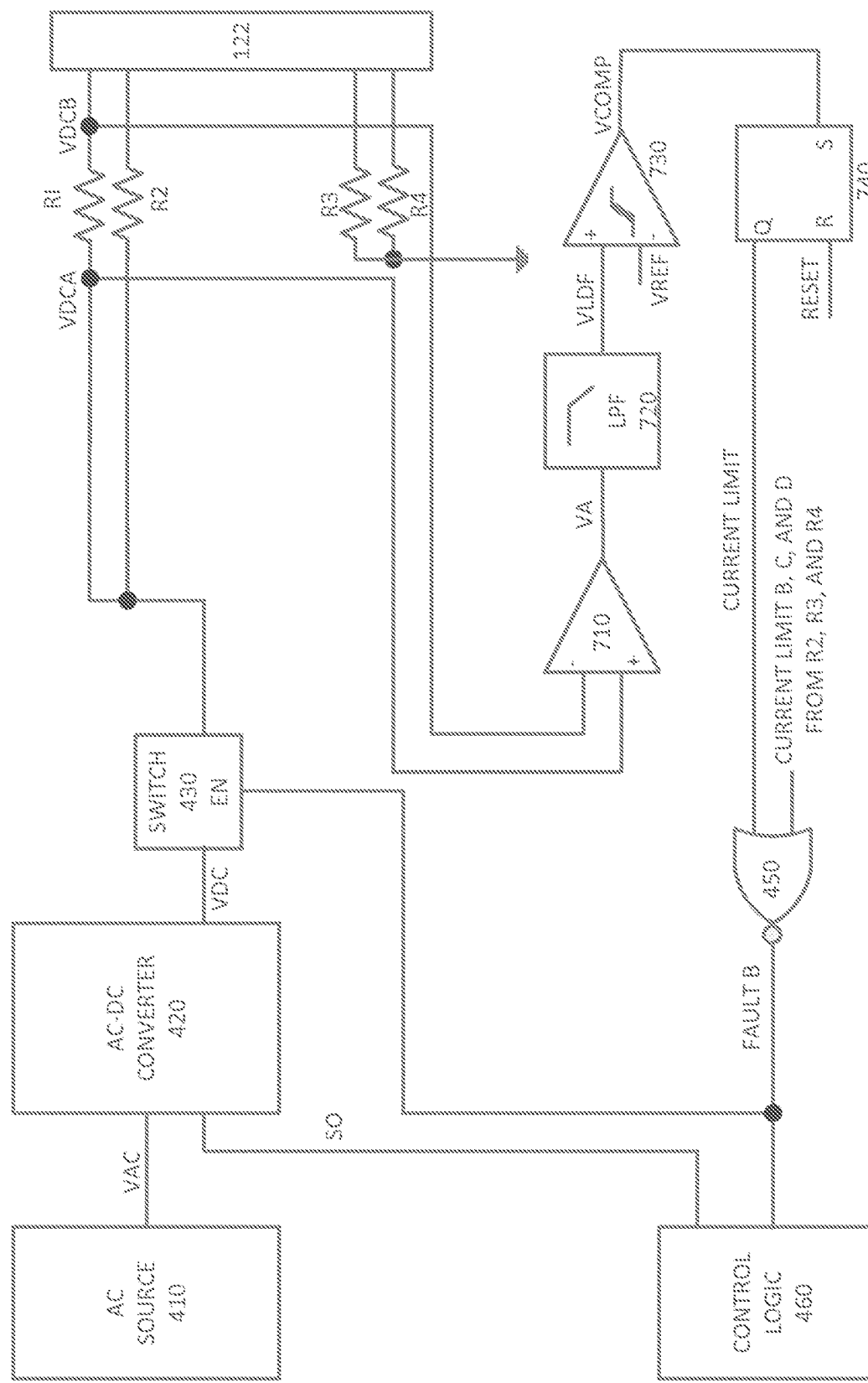
FIG. 7 illustrates a more detailed schematic of a current limit circuit according to an embodiment of the present invention.

FIG. 7 illustrates a more detailed schematic of a current limit circuit according to an embodiment of the present invention. This current limit circuit may include amplifier 710. Amplifier 719 may receive and amplify a differential voltage from resistor R1. This amplified voltage may be filtered by a low-pass filter 720, though the low-pass filter 720 may be included in amplifier 710. Low-pass filter 720 may prevent power supply spikes that may appear across resistor R1 from falsely triggering an over-current event. The output of low-pass filter 720 may be compared to a reference voltage by comparator 730. Comparator 730 may set latch or register 740. Latch or register 740 may provide a high signal to NOR gate 450, causing the output signal FAULTB to go low, thereby opening or disabling switch 430. Latch or register 740 may be reset during power on resets, reboots, or other appropriate events. In other embodiments of the present invention, other circuits may be used for this current limit path. For example, latch or register 740 may be implemented as an SR (set-reset) latch, D flip-flop, or other storage circuit. Where a D flip-flop is used, the D input may be tied high and the output of comparator 730 may clock the D flip-flop. Also, other circuits may be used in place of NOR gate 450 and other components may be used in place of the resistors, such as resistor R1. For example, field effect transistors may be used in place of resistors such as resistor R1. Again, transient voltage suppressant circuits, such as diodes D1 and D2 and capacitors C1 and C2 in FIG. 4 may be included to protect switch 430 but are omitted here for clarity.

In still other embodiments of the present invention, other types of safety features may be included. For example, fuses may be included in series with one or more power or ground conductors. These fuses may be protected by the current limit paths, which may shut off power at the switches before the fuses are blown. This may be particularly beneficial where these fuses may be difficult to access or expensive to replace. An example is shown in the following figure.

Figure 8:
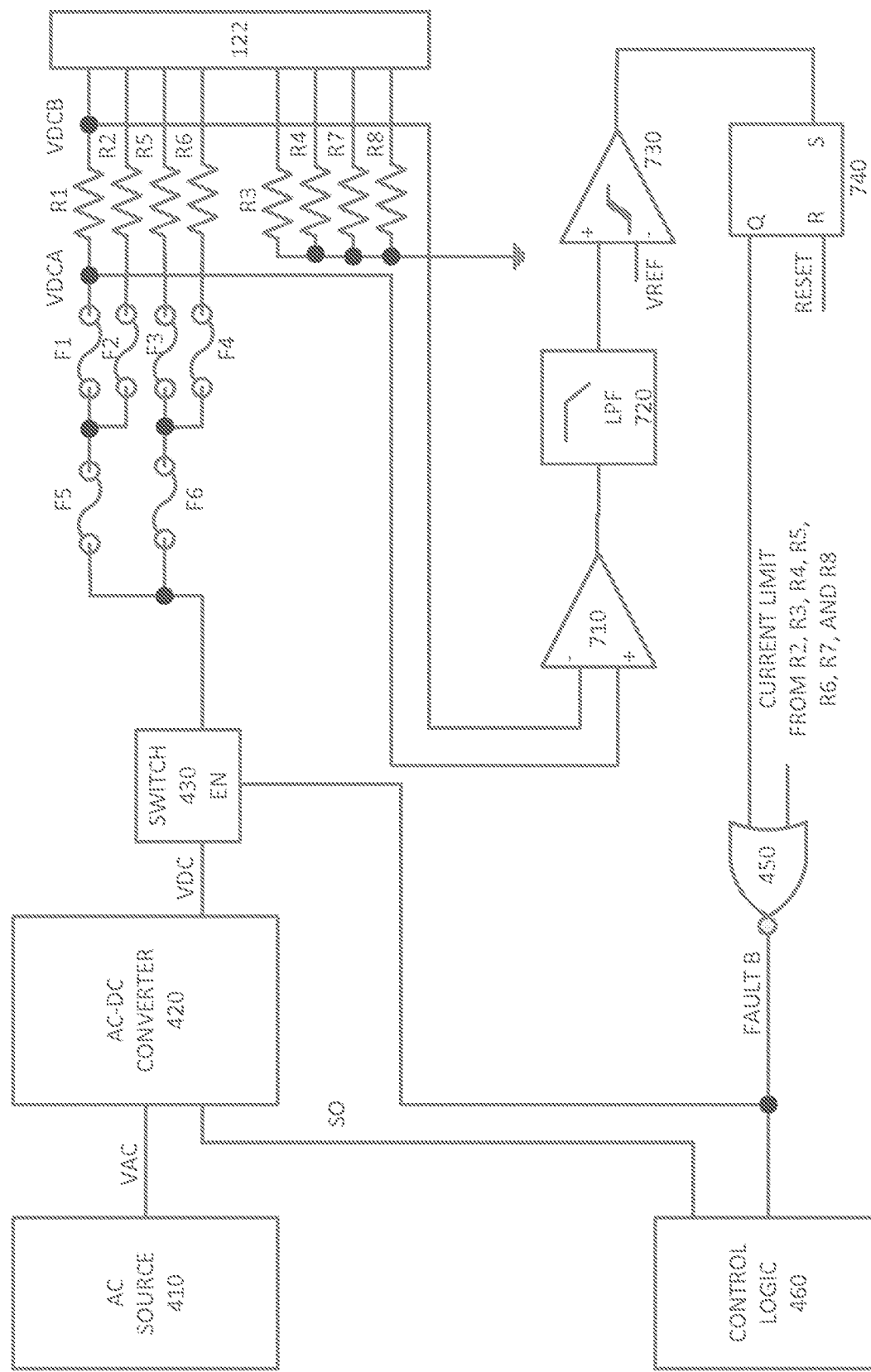
FIG. 8 illustrates power supply circuitry that includes a number of protection fuses according to an embodiment of the present invention.

FIG. 8 illustrates power supply circuitry according to an embodiment of the present invention. In this example, fuses F1, F2, F3, and F4 may be in line with resistors R1, R2, R5, and R6. Again, when an excess current is detected, for example through resistor R1, the current limit path and switch 430 may react fast enough to prevent fuse F1 from blowing. In this way, the fuses may be provided as a backup or secondary safety device. That is, the fuses may be provided as an additional safety measure in case a current sense path or switch fails. Additional fuses F5 and F6 may be placed in series with one or more of these fuses. Providing these additional fuses may provide further protection for the electronic system incorporating this power supply. Providing these additional fuses may also be useful for regulatory purposes, for example where there may be limits on an amount of power that may be provided by a single conductor. Again, transient voltage suppressant circuits, such as diodes D1 and D2 and capacitors C1 and C2 in FIG. 4 may be included to protect switch 430 but are omitted here for clarity.

Again, embodiments of the present invention may provide even further safety measures. For example, embodiments of the present invention may avoid providing high voltages where the high voltages may be inadvertently contacted by a user. Accordingly, embodiments of the present invention may employ one or more additional measures to avoid such an occurrence.

In one example, a remote connection sense circuit may be used. A low power supply voltage may be provided over the cable. This low power supply voltage may be low enough to not cause harm in the event that it is inadvertently contacted by a user. The load, such as electronic device 130, may include the remote connection sense circuit. This circuit may be powered up by the low power supply voltage. Once powered up, this circuit may provide a response back to the power supply circuit indicating that the cable is connected to the electronic device 130. This may mean that power provided over the cable may not be inadvertently accessible by the user. Upon receipt of this response, the power supply circuit may provide a higher voltage power supply. In various embodiments of the present invention, the low and high power supplies may be provided over the same or different conductors in the cable.

In various embodiments of the present invention, this result may be achieved even though a cable connector may be at least slightly skewed in a connector in the electronic device, power supply, or both. This skew may result in some contact pins being exposed and it may create a situation where an inadvertent disconnection may be easily possible. Accordingly, another embodiment of the present invention may provide circuitry to detect whether one or both of the cable connectors are properly seated in connectors in the power supply, electronic device, or both.

In one example, a connector may have a first contact at a first end and a second contact at a second end. These contacts may mate with corresponding contacts in a corresponding connector. When both the first contact and the second contact are engaged with corresponding contacts in a second connector, it may be determined that the connectors are properly engaged. The first and second contacts may be short or spaced further from a leading edge of a connector to form a last-make-first-break connection.

Accordingly, embodiments of the present invention may use both of these techniques in determining whether a high power supply should be provided over a cable. An example is shown in the following figure.

Figure 9:
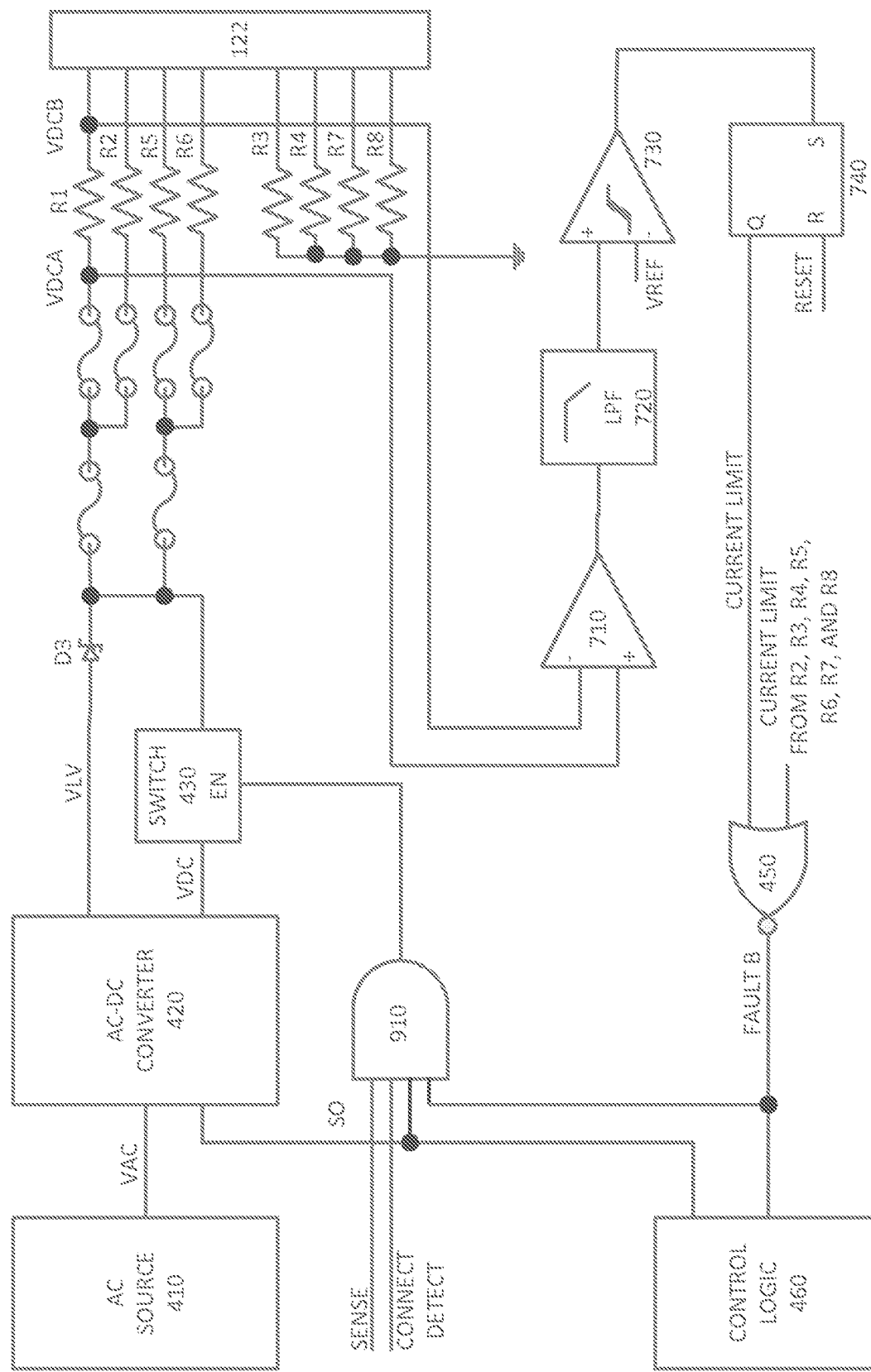
FIG. 9 illustrates power supply circuitry having additional safety circuits according to an embodiment of the present invention.

FIG. 9 illustrates power supply circuitry according to an embodiment of the present invention. In this example, AND gate 910 may be included. AND gate 910 may receive the FAULTB signal from NOR gate 450 and its associated current limit circuits. AND gate 910 may also receive power source shut down signal SO from control logic 460. AND gate 910 may also receive a sense signal and a connect detect signal. When each of these signals is high, switch 430 may be enabled and a high power supply voltage VDC may be provided from power source or AC-to-DC converter 420 to conductors connected to connector 122. When any one of these is low, switch 430 may be opened, thereby disconnecting power source or AC-to-DC converter 420 from conductors connected to connector 122.

At startup, a low-voltage VLV may be provided over conductors associated with resistors R1, R2, R5, and R6. This low-voltage may be received by a connection sense circuit in a remote load. The connection sense circuit may return a signal in response to receiving this low voltage to the power supply or associated circuitry. This response, or a version of it, may be provided as signal SENSE to gate 910.

Connector 122, or a corresponding connector in an electronic device, or both, may have a first contact at a first end and a second contact at a second end. These contacts may mate with corresponding contacts in a corresponding connector. When both the first contact and the second contact are engaged with corresponding contacts in a second connector, it may be determined that the connectors are properly engaged. The first and second contacts may be short or spaced further from a leading edge of a connector to form a last-make-first-break connection. When it is determined that proper connections are made, the CONNECT DETECT signal received by AND gate 910 may be high. Again, transient voltage suppressant circuits, such as diodes D1 and D2 and capacitors C1 and C2 in FIG. 4 may be included to protect switch 430 but are omitted here for clarity.

Again, embodiments of the present invention may provide an additional safety feature by ensuring that a cable is connected before providing power over it. An example of one such method is shown in the following figure.

Figure 10:
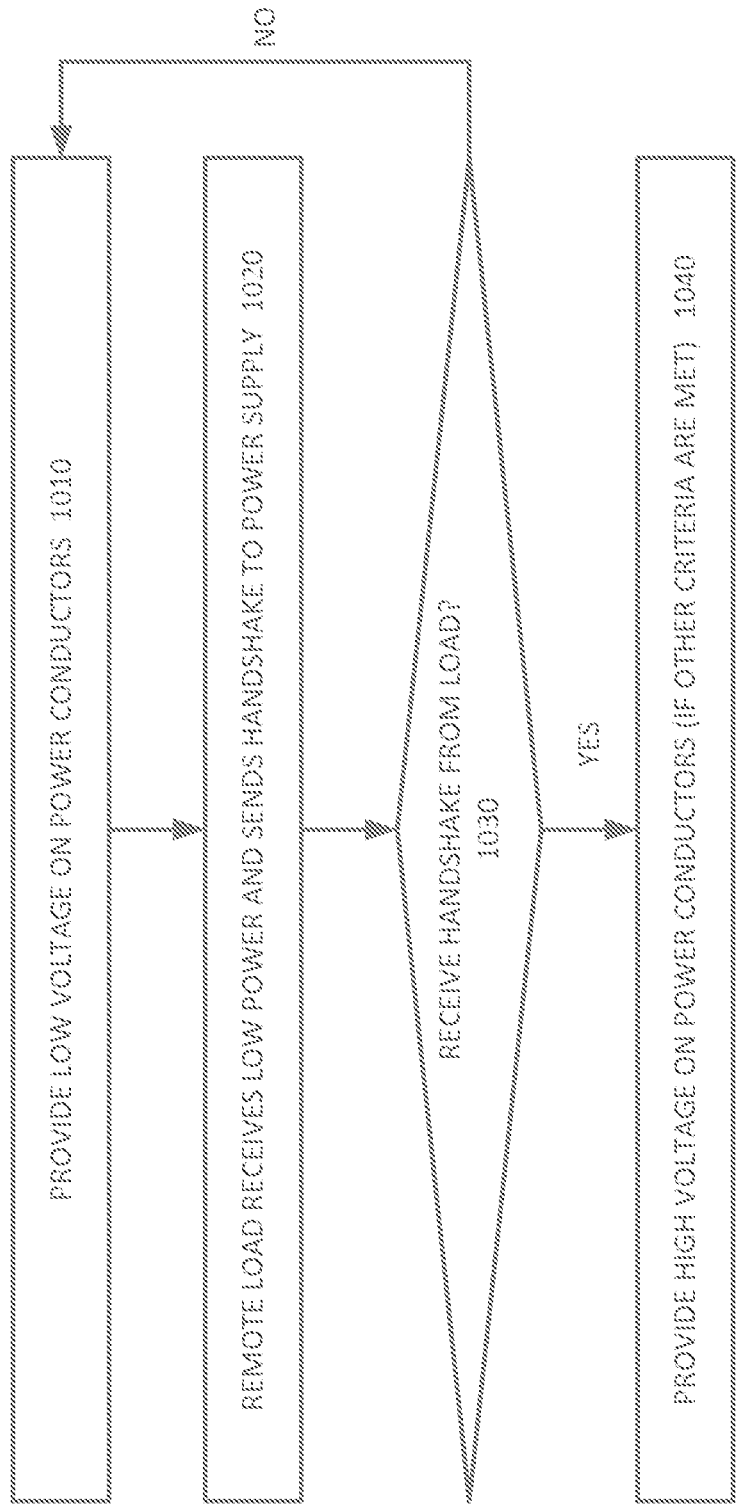
FIG. 10 illustrates a method of ensuring that a cable is connected before providing power according to an embodiment of the present invention.

FIG. 10 illustrates a method of ensuring that a cable is connected before providing power according to an embodiment of the present invention. In act 1010, a low-voltage supply may be provided on one or more power conductors of the cable. In act 1020, a remote device may send a handshake signal back to the power supply. In act 1030, it may be determined whether the handshake has been received from the load. If it has not, the low-voltage supply may remain on the power conductors in act 1010. Once the handshake has been received, then in act 1040, a high-voltage may be provided on the power conductors of the cable, so long as other necessary or requirements are met.

Again, further embodiments the present invention may provide an additional safety feature by ensuring that connectors for this cable are properly seated in corresponding connectors in either the power supply, electronic device, or both, before power may be applied to the cable. An example of one such method is shown in the following figure.

Figure 11:
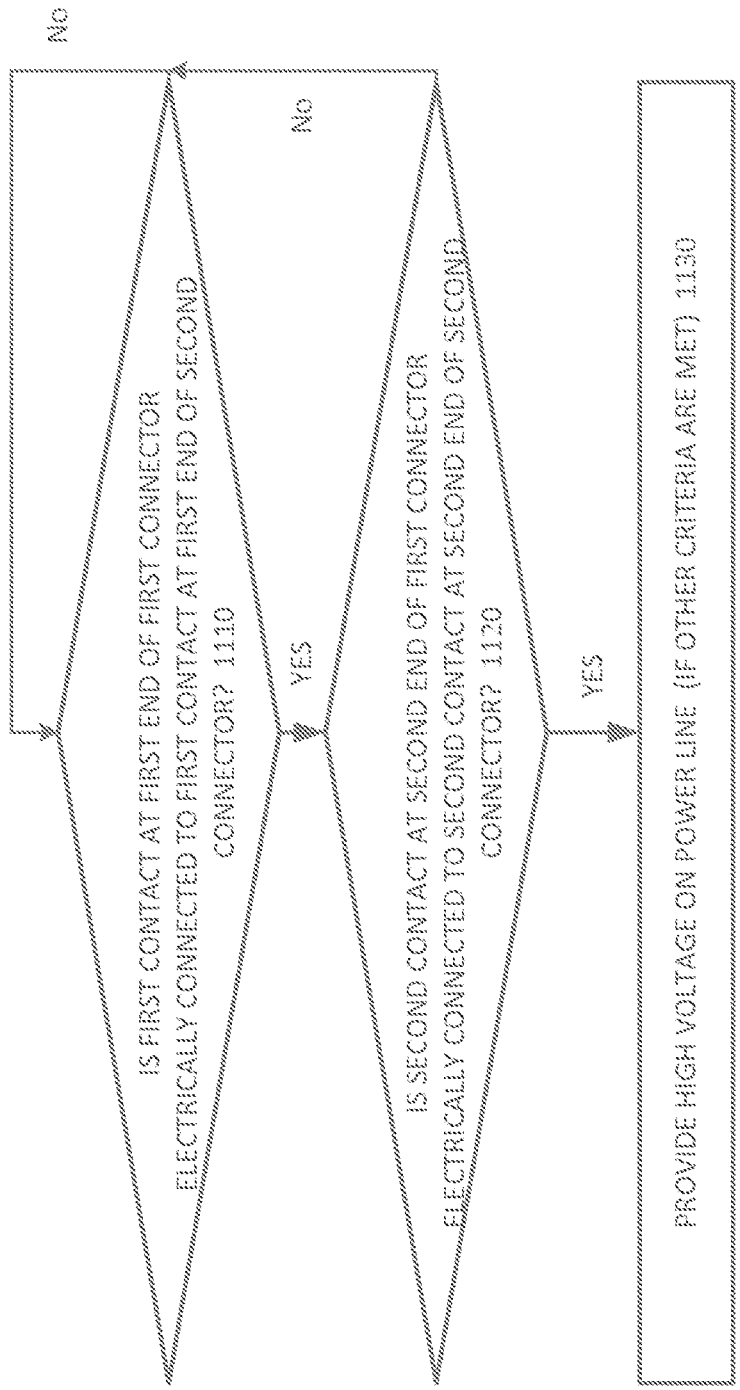
FIG. 11 illustrates a method of ensuring that one or more connectors of a cable are properly seated before power is provided to the cable according to an embodiment of the present invention.

FIG. 11 illustrates a method of ensuring that one or more connectors of a cable are properly seated before power is provided to the cable according to an embodiment of the present invention. In act 1110, it may be determined whether a first contact at a first end of a first connector is electrically connected to a first contact at a first end of a second connector. In act 1120, it may be determined whether a second contact at a second end of the first connector is electrically connected to a second contact at a second end of the second connector. If answer is yes to both, then in act 1130, a high power supply voltage may be provided on the cable, so long as other necessary requirements are met.

In the above examples, a power source or AC-to-DC converter 420 may provide a low voltage over one or more conductors of a cable. This power supply may be protected from high reverse voltages by diode D3. In other embodiments of the present invention, this low power supply may be protected from short circuits or other events by a switch. An example is shown in the following figure.

Figure 12:
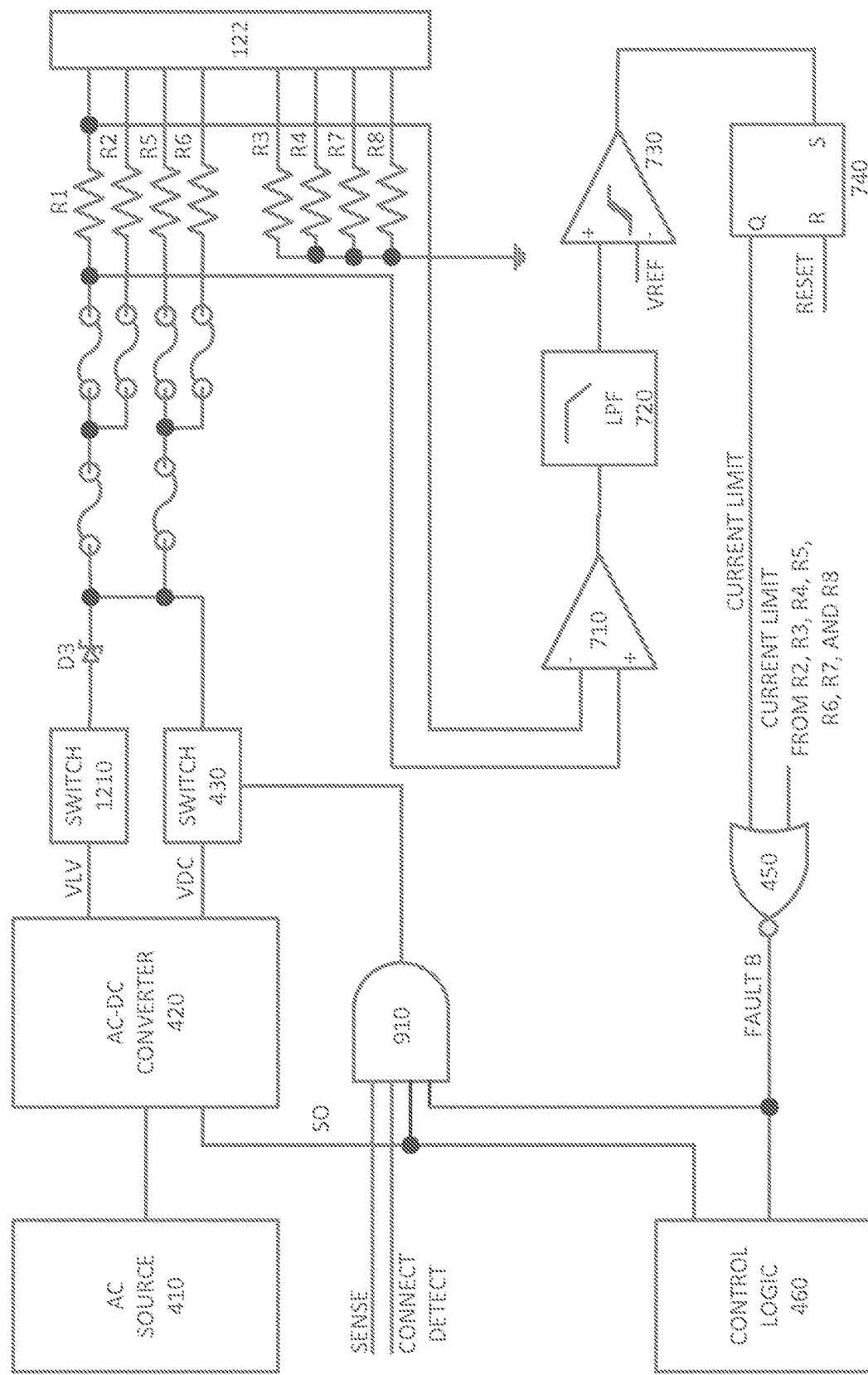
FIG. 12 illustrates power supply circuitry including a low-voltage protection switch according to an embodiment of the present invention.

FIG. 12 illustrates power supply circuitry including a low-voltage protection switch according to an embodiment of the present invention. In this example, a low voltage power supply may be protected by switch 1210. A low voltage power supply may be further protected by diode D3. Diode D3 may prevent reverse currents from flowing back through switch 1210 into power source or AC-to-DC converter 420.

Switch 1210 may be a self-resetting switch that may open when a large current is drawn through it. For example, switch 1210 may include temperature sensing circuitry. When a large current passes through switch 1210, the temperature sensing circuitry may open switch 1210, thereby disconnecting the low voltage power supply from conductors of a cable connected to connector 122. As the temperature drops, switch 1210 may be reset and closed, thereby reconnecting the low power supply voltage to the conductors in the cable. Again, transient voltage suppressant circuits, such as diodes D1 and D2 and capacitors C1 and C2 in FIG. 4 may be included to protect either or both switch 430 and 1210 but are omitted here for clarity.

In other embodiments of the present invention, a software-oriented solution may be employed. For example, a microcontroller may be used in place of the current sense paths in the above examples. An example is shown in the following figure.

Figure 13:
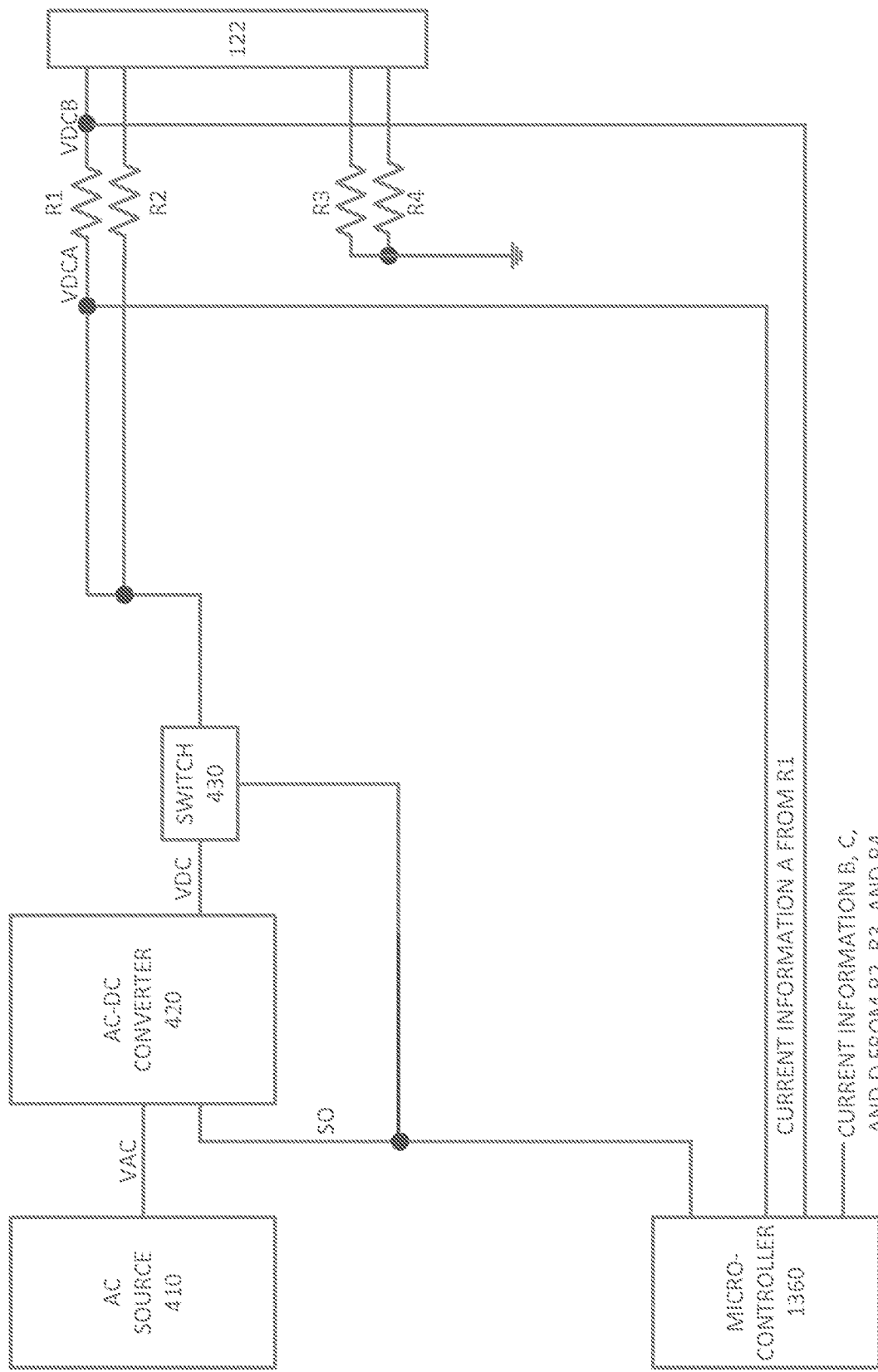
FIG. 13 illustrates another power supply having shut-off path that includes a microcontroller according to an embodiment of the present invention.

FIG. 13 illustrates another power supply having shut-off path that includes a microcontroller according to an embodiment of the present invention. In this example, a differential voltage across R1 may be provided to microcontroller 1360. Similar differential voltages for the remaining resistors may be provided to microcontroller 1360 as well. Microcontroller 1360 may sense a fault condition in one or more conductors and may shut off power source or AC-to-DC converter 420 and open switch 430.

While in the above examples, switches are typically opened when excess current conditions are detected, in other embodiments of the present invention, switches may be opened where the current in a resistor is low or absent. For example, if no current is detected in resistors R3 or R4, it may be determined that a ground path external to the power supply may exist. This may be undesirable and microcontroller 1360 may accordingly shut off or disable AC-to-DC converter 420 and open switch 430. Again, transient voltage suppressant circuits, such as diodes D1 and D2 and capacitors C1 and C2 in FIG. 4 may be included to protect switch 430 but are omitted here for clarity.

As shown above in FIG. 3, embodiments of the present invention may provide power to more than one electronic device over more than one cable. An example of such a power supply is shown in the following figure.

Figure 14:
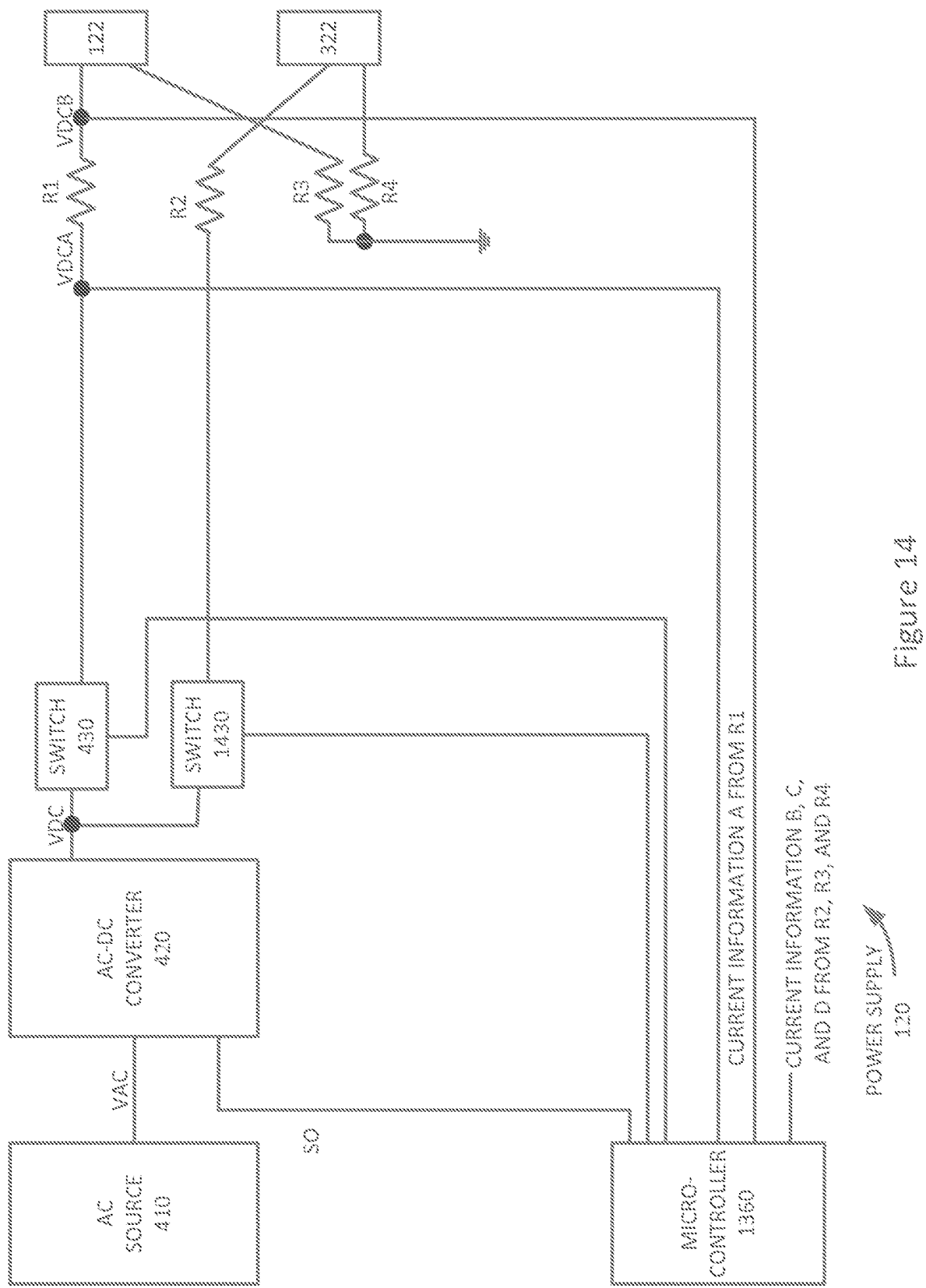
FIG. 14 illustrates a power supply that may provide power to more than one electronic device according to an embodiment of the present invention.

FIG. 14 illustrates a power supply that may provide power to more than one electronic device according to an embodiment of the present invention. In this example, a power supply and a ground connection may be formed at connector 122, while a separate power supply and ground connection may be formed at connector 322. Each connector 122 and 322 may connect to a connector of a separate cable, such as cables 140 and 340 above. These separate cables may provide power to one or more electronic devices, such as electronic equipment 130 and 430 above. As before, current level information for resistors in series with these connections may be read by microcontroller 1360. In other embodiments of the present invention, current limit or detect circuits, such as the current limit or detect circuits shown above, may be used in place of microcontroller 1360. Again, transient voltage suppressant circuits, such as diodes D1 and D2 and capacitors C1 and C2 in FIG. 4 may be included to protect either or both switch 430 and 1430 but are omitted here for clarity.

Figure 15:
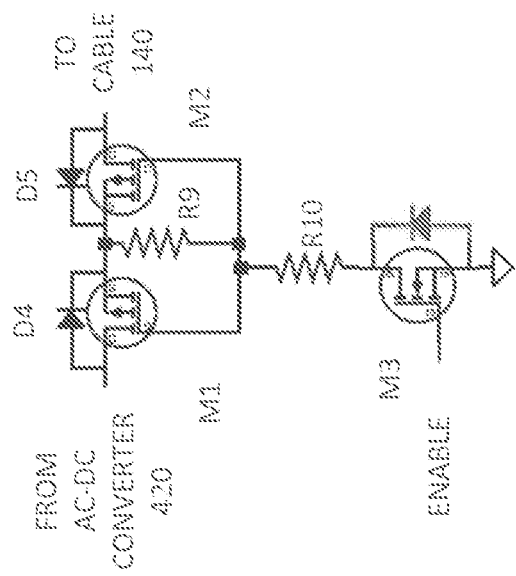
FIG. 15 illustrates a switch that may be employed by embodiments of the present invention.

FIG. 15 illustrates a switch that may be used as switch 430 and the other switches in the above examples and other embodiments of the present invention. In this example, when the enable input is high, M3 conducts, thereby generating a voltage across resistor R9. The voltage across resistor R9 may generate a VGS voltage sufficient to turn on transistors M1 and M2, thereby biasing them in the conducting region. When M1 and M2 are on, the input from the AC to DC converter 420 may be shorted to resistors leading to cable 140. Resistor R10 may be included to stand off voltage to limit the VGS applied to transistors M1 and M2, thereby providing voltage protection for these devices. Back-to-back diodes D4 and D5, which may be part of transistors M1 and M2, may provide forward and reverse current blocks when the switch is opened or disabled. Again, in other embodiments of the present invention, relays, micro-electromagnetic switches, or other types of switches may be used for one or more of these switches.

In these and other embodiments of the present invention, the cables may convey data and power. This power and data may include signals that are compliant with various standards such as Universal Serial Bus (USB), a High-Definition Multimedia Interface (HDMI), Digital Visual Interface (DVI), power, Ethernet, DisplayPort, Thunderbolt, Lightning and other types of standard and non-standard interfaces that have been developed, are being developed, or will be developed in the future. In various embodiments of the present invention, the paths provided these cables may be used to convey power, ground, signals, test points, and other voltage, current, data, or other information.

Embodiments of the present invention may provide power, and possibly communicate with, various types of devices, such as portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, devices for providing functional or decorative lighting, and other devices.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A power supply comprising:
   a connector;
   a power source;
   a first current path between the power source and a first contact of the connector;
   a second current path between the power source and a second contact of the connector;
   a first current sense circuit to sense a first current in the first current path, wherein in response to sensing the first current above a first level, the first current sense circuit provides a first signal to disconnect the power source from the first current path and the second current path; and
   a second current sense circuit to sense a second current in the second current path, wherein in response to sensing the second current above a second level, the second current sense circuit provides a second signal to disconnect the power source from the first current path and the second current path.

2. The power supply of claim 1 wherein the power source comprises an AC-to-DC converter.

3. The power supply of claim 1 further comprising a switch between the power source and the first current path and further between the switch and the second current path.

4. The power supply of claim 3 further comprising a first voltage transient suppressant circuit coupled to the power source and the switch and a second voltage transient suppressant circuit coupled to the switch and the first and second current paths.

5. The power supply of claim 4 wherein the first voltage transient suppressant circuit comprises a first voltage transient suppressant diode and a first capacitor and the second voltage transient suppressant circuit comprises a second voltage transient suppressant diode and a second capacitor.

6. The power supply of claim 4 wherein in response to sensing the first current above the first level, the first current sense circuit provides the first signal to open the switch between the power source and the first current path and the second current path thereby disconnecting the power source from the first current path and the second current path, and
wherein in response to sensing the second current above the second level, the second current sense circuit provides the second signal to open the switch between the power source and the first current path and the second current path thereby disconnecting the power source from the first current path and the second current path.

7. The power supply of claim 6 wherein the first current sense circuit senses the first current in the first current path by measuring a voltage across a resistor in the first current path and wherein the second current sense circuit senses the second current in the second current path by measuring a voltage across a resistor in the second current path.

8. The power supply of claim 7 further comprising:
a third current path between a third contact in the connector and ground;
a fourth current path between a fourth contact in the connector and ground;
a third current sense circuit to sense a third current in the third current path, wherein in response to sensing the third current above a third level, the third current sense circuit provides a third signal to disconnect the power source from the first current path and the second current path; and
a fourth current sense circuit to sense a fourth current in the fourth current path, wherein in response to sensing the fourth current above a fourth level, the fourth current sense circuit provides a fourth signal to disconnect the power source from the first current path and the second current path.

9. The power supply of claim 1 wherein the connector is a connector receptacle.

10. The power supply of claim 1 further comprising:
a third current path between ground and a third contact of the connector;
a fourth current path between ground and a fourth contact of the connector;
a third current sense circuit to sense a third current in the third current path, wherein in response to sensing the third current above a third level, the third current sense circuit provides a third signal to disconnect the power source from the first current path and the second current path; and
a fourth current sense circuit to sense a fourth current in the fourth current path, wherein in response to sensing the fourth current above a fourth level, the fourth current sense circuit provides a fourth signal to disconnect the power source from the first current path and the second current path.

11. A power supply comprising:
a power source;
a first switch coupled to an output of the power source;
a first resistor having a first terminal coupled to the switch;
a second resistor having a first terminal coupled to the switch;
a first current sense circuit having a first input coupled to the first terminal of the first resistor, a second input coupled to a second terminal of the first resistor, and an output coupled to a control input of the switch; and
a second current sense circuit having a first input coupled to the first terminal of the second resistor, a second input coupled to a second terminal of the second resistor, and an output coupled to the control input of the first switch.

12. The power supply of claim 11 further comprising a connector having a first contact coupled to the second terminal of the first resistor and a second contact coupled to the second terminal of the second resistor.

13. The power supply of claim 12 further comprising:
a third resistor having a first terminal coupled to a third contact in the connector and a second terminal coupled to ground;
a fourth resistor having a first terminal coupled to a fourth contact in the connector and a second terminal coupled to ground;
a third current sense circuit having a first input coupled to the first terminal of the third resistor, a second input coupled to a second terminal of the third resistor, and an output coupled to the control input of the switch; and
a fourth current sense circuit having a first input coupled to the first terminal of the fourth resistor, a second input coupled to a second terminal of the fourth resistor, and an output coupled to the control input of the switch.

14. The power supply of claim 12 wherein the first current sense circuit comprises a low-pass filter in series with a comparator.

15. The power supply of claim 14 further comprising a storage circuit in series with the comparator.

16. The power supply of claim 15 wherein the storage circuit is a set-reset latch.

17. The power supply of claim 12 further comprising a first fuse between the switch and the first resistor and a second fuse between the switch and the second resistor.

18. The power supply of claim 17 further comprising a third fuse between the first fuse and the switch and further between the second fuse and the switch.

19. A method of using a power supply to provide power over a cable, the method comprising:
detecting that a first connector at a first end of the cable is properly connected to a second connector by detecting that a first contact in the first connector is connected to a first contact in the second connector and a second contact in the first connector is connected to a second contact in the second connector, wherein the first contact in the first connector and the second contact in the first connector are on opposite ends of the first connector; and
providing a first power supply voltage over the cable to a first circuit coupled to the second connector; and
receiving a response from the first circuit; then
providing a second power supply voltage over the cable, and if a response is not received from the first circuit, then
not providing the second power supply voltage.

20. The method of claim 19 wherein the second power supply voltage is provided over a first conductor and a second conductor, the method further comprising, while providing the second power supply voltage over the cable:
detecting a first current in the first conductor;
detecting a second current in the second conductor; and
in response to either the first current or the second current being higher than a first threshold, not providing the second power supply voltage over the cable, otherwise continuing to provide the second power supply voltage over the cable.

21. The method of claim 20 wherein the second connector is housed in an electronic device powered by the power supply.

* * * * *